United States Patent
Frantz et al.

(10) Patent No.: US 9,663,218 B2
(45) Date of Patent: May 30, 2017

(54) HYDRAULIC SYSTEM FOR CONTROLLING THE ORIENTATION OF FAN BLADES

(75) Inventors: Caroline Frantz, Maisons-Alfort (FR); Regis Michel Paul Deldalle, Servon (FR)

(73) Assignee: SNECMA, Paris (FR)

( * ) Notice: Subject to any disclaimer, the term of this patent is extended or adjusted under 35 U.S.C. 154(b) by 610 days.

(21) Appl. No.: 14/237,753

(22) PCT Filed: Aug. 3, 2012

(86) PCT No.: PCT/FR2012/051844
§ 371 (c)(1),
(2), (4) Date: Feb. 7, 2014

(87) PCT Pub. No.: WO2013/021127
PCT Pub. Date: Feb. 14, 2013

(65) Prior Publication Data
US 2014/0193261 A1   Jul. 10, 2014

(30) Foreign Application Priority Data
Aug. 8, 2011   (FR) ...................................... 11 57229

(51) Int. Cl.
*B64C 11/38* (2006.01)
*B64C 11/30* (2006.01)
(Continued)

(52) U.S. Cl.
CPC ............ *B64C 11/38* (2013.01); *B64C 11/303* (2013.01); *B64C 11/308* (2013.01); *B64C 11/42* (2013.01);
(Continued)

(58) Field of Classification Search
CPC ....... B64C 11/38; B64C 11/42; B64C 11/303; B64C 11/308; F02K 3/025; F01D 7/00;
(Continued)

(56) References Cited

U.S. PATENT DOCUMENTS

| | | |
|---|---|---|
| 2,865,460 A | 12/1958 | St John, Jr. |
| 3,219,121 A | 11/1965 | Barden |

(Continued)

FOREIGN PATENT DOCUMENTS

EP   1 967 739   9/2008

OTHER PUBLICATIONS

International Search Report Issued Nov. 28, 2012 in PCT/FR12/051844 Filed Aug. 3, 2012.

*Primary Examiner* — John C Hong
(74) *Attorney, Agent, or Firm* — Oblon, McClelland, Maier & Neustadt, L.L.P.

(57) ABSTRACT

A hydraulic system for controlling orientation of fan blades in a turbine engine including at least one set of adjustable pitch fan blades actuated by actuators that are connected to a hydraulic pump, and a small pitch protection valve controlled by an associated solenoid valve to make it possible on the ground, when the orientation of the blades is substantially perpendicular to the axis of the turbine engine, to pass from a first operating zone in which a speed of pitch variation of the blades is low to a second operating zone in which a speed of pitch variation is considerably higher, wherein operating pressure of the hydraulic pump is controlled by the solenoid valve controlling the small pitch protection valve to define two outlet levels corresponding to the two operating zones.

7 Claims, 3 Drawing Sheets

(51) Int. Cl.
*B64C 11/42* (2006.01)
*F01D 7/00* (2006.01)
*F02K 3/02* (2006.01)
*B64D 27/00* (2006.01)

(52) U.S. Cl.
CPC ............... *F01D 7/00* (2013.01); *F02K 3/025* (2013.01); *B64D 2027/005* (2013.01); *F05D 2220/324* (2013.01); *F05D 2220/325* (2013.01); *F05D 2220/36* (2013.01); *F05D 2260/79* (2013.01); *F05D 2270/64* (2013.01); *Y02T 50/66* (2013.01); *Y02T 50/671* (2013.01)

(58) Field of Classification Search
CPC . Y02T 50/671; Y02T 50/66; F05D 2220/324; F05D 2260/79; F05D 2270/64; F05D 2220/325; F05D 2220/36; B64D 2027/005
See application file for complete search history.

(56) References Cited

U.S. PATENT DOCUMENTS

| | | | |
|---|---|---|---|
| 5,186,608 A | 2/1993 | Bagge | |
| 5,836,743 A | 11/1998 | Carvalho et al. | |
| 8,932,018 B2 * | 1/2015 | Gallet | B64C 11/325 416/153 |
| 8,944,765 B2 * | 2/2015 | Charier | F01D 7/00 416/153 |
| 2008/0219846 A1 | 9/2008 | Annebique et al. | |
| 2011/0002786 A1 | 1/2011 | Perkinson | |

* cited by examiner

HYDRAULIC SYSTEM FOR CONTROLLING THE ORIENTATION OF FAN BLADES

BACKGROUND OF THE INVENTION

The present invention relates to the general field of controlling the orientation of fan blades of a turbine engine. A preferred field of application of the invention is that of two-propeller airplane turboprops.

A two-propeller airplane turboprop comprises a turbine having two contrarotating rotors, each driving a respective set of unducted fan blades. In that type of aeroengine the angle of orientation of the fan blades (also known as their pitch) constitutes one of the parameters used for managing the thrust of the engine.

French patent application number 10/51458 filed on Mar. 1, 2010 by the Applicant describes a system for controlling the orientation of the fan blades of such a turboprop. In that document, each blade is coupled, for the purpose of adjusting its orientation, to a blade root support that is pivotally mounted on a rotary ring by means of bevel gearing, one of the gears of that gearing being supported by the blade root support and the other gear and carrying a counterweight. A hydraulic actuator that is centered on the axis of rotation of the rotary ring and that is constrained to rotate together with the turbine rotor is connected to each of the counterweights via a respective radial link. By actuating the actuator, the links are caused to act on the counterweights on a rod/crank principal in order to cause the blade root supports to turn in synchronized manner. Such a control system presents numerous advantages. In particular, it is reliable and light in weight since it possesses relatively few parts compared with prior art control systems.

Changing the orientation of the blades between stages of flight and stages in which the airplane has its wheels on the ground (idling on the ground, taxiing, or indeed moving the blades into a thrust-reversal position) involves passing through a zone in which the pitch of the propellers is small and gives rise to a large amount of drag.

Thus, in order to avoid excessive drag, while also complying with the changeover time required for passing into the thrust-reversal position, it is necessary to double the speed of movement of the actuators actuating the pitch-changing mechanisms of the propellers of the rotors.

This increase in the speed of movement, combined with a high operating pressure, leads to additional mechanical power being taken off (in particular while idling) and to large amounts of heat being given off by the hydraulic pump that controls the actuators. This has a major impact on dimensioning the equipment in the oil circuit (heat exchangers . . . ), and the amount of power taken from the engines can be unacceptable.

OBJECT AND SUMMARY OF THE INVENTION

A main object of the present invention is thus to mitigate such drawbacks by proposing a hydraulic system for controlling the orientation of fan blades in a turbine engine having at least one set of adjustable pitch fan blades actuated by actuators that are connected to a hydraulic pump, and a small pitch protection valve controlled by an associated solenoid valve to make it possible on the ground, when the orientation of said blades is almost perpendicular to the axis of the turbine engine, to pass from a first operating zone (A) in which the speed of pitch variation of the blades is low to a second operating zone (B) in which said speed of pitch variation is considerably higher, characterized in that the operating pressure of said hydraulic pump is controlled by said solenoid valve controlling said small pitch protection valve in such a manner as to define two outlet levels corresponding to said two operating zones.

Thus, by using the solenoid valve controlling the small pitch protection valve to switch from a normal operating pressure of the pump to a second operating pressure that is smaller, it is possible to accommodate the conflicting requirements in terms of force and of speed that exist in those two operating zones.

Preferably, said hydraulic pump is an axial piston pump.

Advantageously, in a first embodiment, the system includes a bypass duct between an inlet of said solenoid valve and a control inlet of said axial piston pump. It further includes a diaphragm D1 mounted in a low-pressure (BP) return line of said axial piston pump and a diaphragm D2 mounted in the high-pressure (HP) feed line connecting said axial piston pump to said solenoid valve.

In a second embodiment, the system includes a bypass duct between an outlet of said solenoid valve and a control inlet of said axial piston pump. It further includes a diaphragm D2 mounted in the high-pressure (HP) feed line connecting said axial piston pump to said solenoid valve.

The invention also provides a two-propeller turboprop including a hydraulic system for controlling the orientation of fan blades as specified above.

BRIEF DESCRIPTION OF THE DRAWINGS

Other characteristics and advantages of the invention are described in greater detail on reading the following description of embodiments of the invention given with reference to the accompanying drawings, in which.

DETAILED DESCRIPTION OF THE INVENTION

Figure 3:
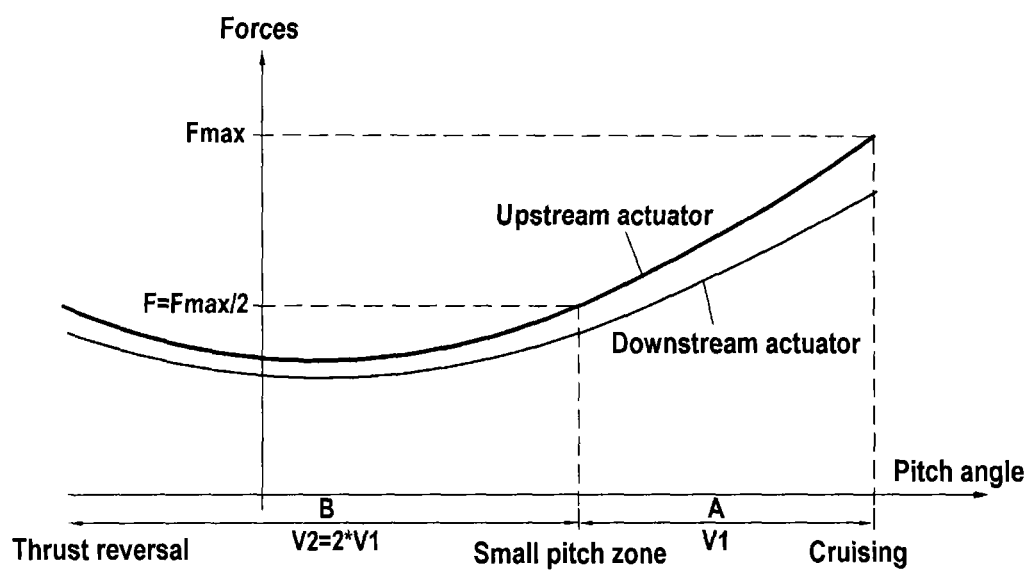
FIG. 3 shows for each of the upstream and downstream actuators, the forces that are applied for pitch adjustment as a function of the pitch angle.

In the mechanism for controlling the orientation (adjusting the pitch) of fan blades as described in patent application FR 10/51458 mentioned in the introduction, the forces that are applied to the actuators as a function of the angle at the roots of the blades (pitch angle) varies as shown by the curves in FIG. 3. Two distinct operating zones can be seen therein: a first zone A (in fight for large pitch angles) in which the speed with which the pitch of the blades is varied is low while the forces on the pistons of the actuators are high, and a second zone B (on the ground for a pitch angle of less than a determined limit) in which the speed required for varying the pitch of the blades is twice as fast, while the forces on the pistons are halved. This particular limit that separates these two operating zones is referred to as the "small pitch zone" (or "min pitch flight") in which drag is at a maximum (blades almost perpendicular to the axis of the airplane and thus of the turbine engine).

Figure 2:
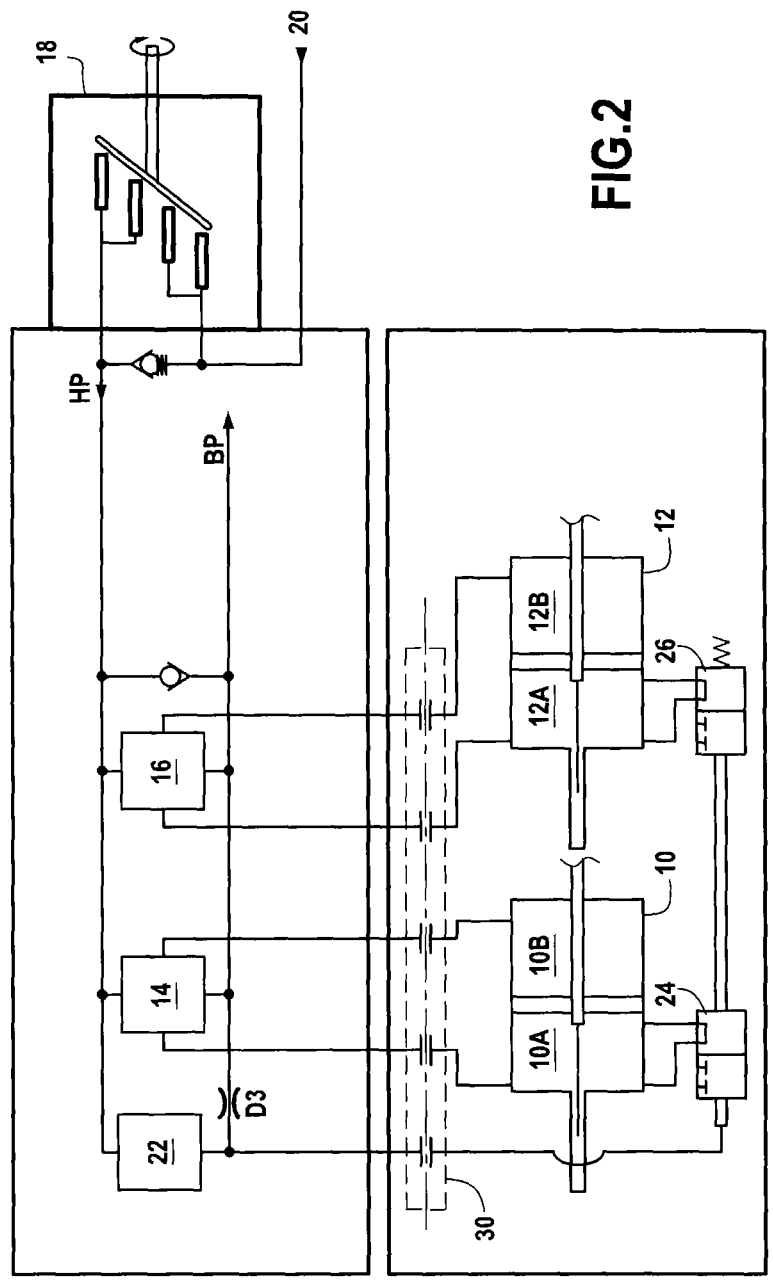
FIG. 2 is a diagrammatic view of the prior art hydraulic system for adjusting pitch.

The hydraulic control system for varying the pitch of the blades of the fan of a turbine engine such as an airplane turboprop is shown diagrammatically in FIG. 2. The adjustable pitch fan blades (not shown) are actuated by actuators 10, 12, with the movements of the actuators being controlled by respective servovalves 14, 16 powered from a hydraulic drive motor such as a hydraulic pump 18, itself powered by a general feed pump (booster pump 20) situated upstream of the system.

Preferably, this hydraulic pump is constituted by a variable cylinder capacity pump of the type comprising a pump with axial pistons and in which the cylinder block having a set of pistons/pads sliding therein is driven in rotation by the pump shaft. Since the swashplate is inclined, the pistons that are held pressed against this swashplate perform back-and-forth movements of an amplitude, as defined by the angle of inclination of the swashplate, that determines the cylinder capacity of the pump. The cylinder chambers in the cylinder block are connected, via two kidney-bean shapes, to the suction and delivery ports formed in the pump body. During the reverse movement of the piston, it faces the suction port and the expansion in the volume of the chamber creates suction that sucks in fluid. During forward movement of the piston, the reduction in the volume of the chamber creates extra pressure that urges the fluid towards the delivery. The angle of inclination of the swashplate is controlled, on one side by a control piston driven by a control pressure, and on the other by a compensation piston.

To prevent the propellers being at a small pitch in flight, which might lead to excessive drag, the blade control system also includes a system for providing protection against such small propeller pitches, which system is constituted by an on/off solenoid valve 22 connected to the high-pressure (HP) delivery outlet of the pump 18 and that controls a small pitch protection valve 24, 26 associated with each of the actuators, a diaphragm D3 also being arranged in the low-pressure BP2 return line of the on/off solenoid valve 22.

When the on/off solenoid valve is closed (no electrical control signal), the small pitch protection valve prevents the actuators from moving towards the retracted rod by creating respective short circuits in the chambers 10A, 10B; 12A, 12B. When the on/off solenoid valve is open (non-zero electrical control signal), the high pressure from the pump 18 is modulated by the low pressure by the diaphragm D3 pressing against the end of the small pitch protection valve to overcome the force of its spring, and the valve opens, thus allowing the actuator to move into the small propeller pitch zone (actuator rod retracted).

Since the force and speed requirements in these two operating zones are in opposition, it is proposed in the invention to make use of the on/off solenoid valve 22 being switched on to switch to a second outlet pressure from the pump 18 that is smaller than the pressure that exists in normal operation (half the pressure in this example).

Figure 1:
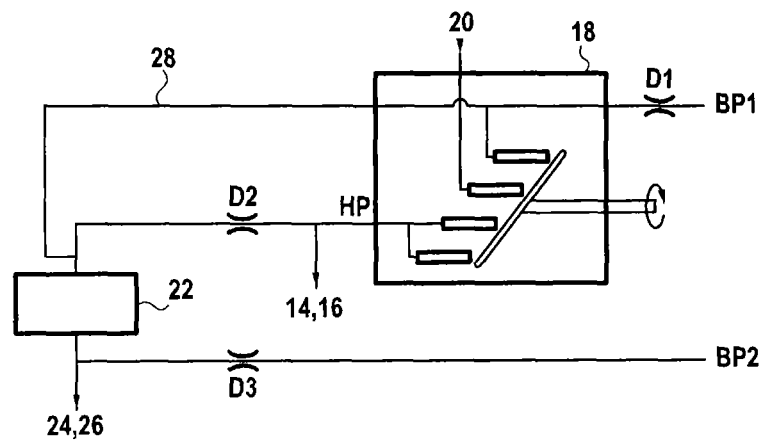
FIG. 1 is a fragmentary diagrammatic view of the modified hydraulic system for adjusting pitch in a first embodiment of the invention that enables the pump to be switched between two operating pressures.

To do this, and as shown by the first embodiment of FIG. 1, provision is made for adding a bypass duct 28 between the inlet of the on/off solenoid valve 22 and the control piston of the axial piston pump 18. Also, a diaphragm D1 is mounted in the low-pressure return line of the pump, and a diaphragm D2 is mounted in the high-pressure feed line connecting the pump to the on/off solenoid valve 22, with the diaphragm D3 that is mounted in the low-pressure return line of the on/off solenoid valve naturally remaining present.

The invention, as incorporated in this way in the hydraulic pitch adjustment system, operates as follows: The compensation pressure is taken to be equal to the delivery pressure at the outlet from the pump 18. The admission pressure is equal to the pressure at the outlet from the booster pump 20 situated upstream from the system.

When the on/off solenoid valve 22 that controls the small pitch protection valve is closed, the control pressure Pc is a function of the characteristics of the diaphragms D1 and D2, of the delivery pressure HP at the outlet from the pump 18, and of the low-pressure BP1 upstream from the diaphragm D1. More particularly, it can thus be shown that:

$Pc=(P_{HP}*D2^2+P_{BP1}*D1^2)/(D1^2+D2^2)$.

When the on/off solenoid valve 22 is controlled to be open, the pressure upstream therefrom decreases, and the control pressure Pc, as modulated by the low pressure BP2 at the diaphragm D3, also decreases. It should be observed that although mention is made of two low pressures that are different, it is clear that they could also be identical.

The advantage of the invention is using a single solenoid valve (the on/off valve 22) to satisfy two distinct but simultaneous requirements, namely controlling the small pitch protection valve 24, 26, and also controlling the operating pressure of the pump 18 (delivery pressure at the outlet from the pump).

This solution makes it possible to decrease the operating pressure when changing to a thrust-reversal position for which the speed with which the blade pitch is varied is twice as high as during transients in flight, and thus to reduce the mechanical power drawn from the pump in the small pitch zone, and to decrease heat losses and leaks in the oil transfer bearing (OTB) 30 passing oil from the stationary portion of the engine, e.g. containing the servovalves, to its rotary portion that includes in particular the actuators.

Figure 1A:
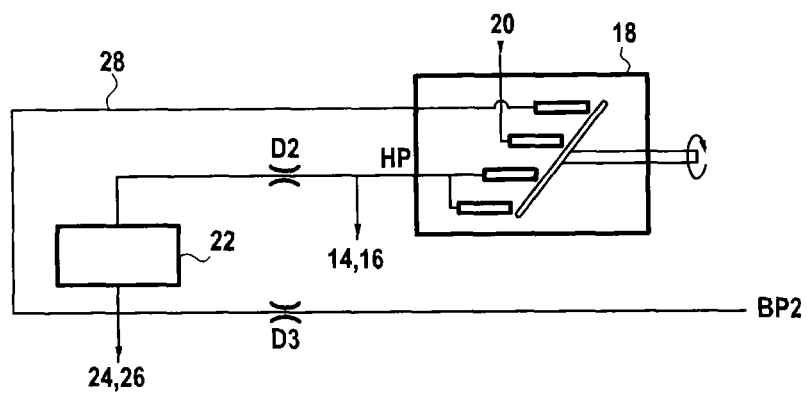
FIG. 1A is a fragmentary diagrammatic view of the modified hydraulic system for adjusting pitch in a second embodiment of the invention that enables the pump to be switched between two operating pressures.

It should be observed that in the event of the control of the on/off solenoid valve 22 being inverted (i.e. open in the absence of an electrical control signal and closed when the control current is nonzero), as shown in the embodiment of FIG. 1A, the bypass duct 28 is mounted between the outlet from the on/off solenoid valve (not its inlet) and the control piston of the pump 18, the diaphragm D1 and the return to the low-pressure line at the control piston no longer being useful in this configuration.

The invention claimed is:

1. A hydraulic system for controlling orientation of fan blades in a turbine engine comprising:
   at least one set of adjustable pitch fan blades actuated by actuators that are connected to a hydraulic pump; and
   a small pitch protection valve controlled by an associated solenoid valve for passing, when the orientation of the blades is substantially perpendicular to the axis of the turbine engine, from a first operating zone in which a speed of pitch variation of the blades is low to a second operating zone in which the speed of pitch variation is higher;
   wherein the operating pressure of the hydraulic pump is controlled by the solenoid valve controlling the small pitch protection valve to define two outlet levels corresponding to the two operating zones.

2. A system according to claim 1, wherein the hydraulic pump is an axial piston pump.

3. A system according to claim 2, further comprising a bypass duct between an let of the solenoid valve and a control inlet of the axial piston pump.

4. A system according to claim 3, further comprising a diaphragm mounted in a low-pressure return line of the axial piston pump and a diaphragm mounted in the high-pressure feed line connecting the axial piston pump to the solenoid valve.

5. A system according to claim 2, further comprising a bypass duct between an outlet of the solenoid valve and a control inlet of the axial piston pump.

6. A system according to claim 5, further comprising a diaphragm mounted in a high-pressure feed line connecting the axial piston pump to the solenoid valve.

7. A two-propeller turboprop comprising a hydraulic system for controlling orientation of fan blades according to claim 1.

* * * * *